United States Patent [19]

Roodenrijs

[11] Patent Number: 5,102,544
[45] Date of Patent: Apr. 7, 1992

[54] APPARATUS FOR CONTINUOUSLY REMOVING CRYSTALS FROM A MOTHER LIQUOR AND FOR WASHING THE CRYSTALS

[75] Inventor: Jacobus P. Roodenrijs, St. Michielsgestel, Netherlands

[73] Assignee: Grasso's Koninklijke Machinefabrieken N.V., Hertogenbosch, Netherlands

[21] Appl. No.: 448,363

[22] Filed: Dec. 11, 1989

[30] Foreign Application Priority Data

Dec. 14, 1988 [NL] Netherlands ............... 8803060

[51] Int. Cl.⁵ .................................. B01D 33/01
[52] U.S. Cl. .................................. 210/296; 62/123; 62/544; 210/297; 210/298; 210/396; 210/415
[58] Field of Search ............ 62/123, 544, 543; 210/413, 296, 319, 359, 511, 295, 396, 415

[56] References Cited

U.S. PATENT DOCUMENTS

| | | | |
|---|---|---|---|
| 3,328,972 | 7/1967 | Svanoe | 62/544 |
| 3,333,436 | 8/1967 | Johnson et al. | 62/544 |
| 3,494,139 | 2/1970 | Shapiro et al. | 62/544 |
| 3,770,386 | 11/1973 | Hayashi et al. | 62/544 |
| 4,332,599 | 6/1982 | Thijssen et al. | 62/123 |
| 4,475,355 | 10/1984 | Thijssen et al. | 62/123 |
| 4,491,462 | 1/1985 | Thijssen et al. | 62/123 |
| 4,734,102 | 3/1988 | Thijssen et al. | 62/123 |
| 4,774,008 | 9/1988 | Roodenrijs | 210/415 |
| 4,830,645 | 5/1989 | Ghodsizadeh et al. | 62/544 |

FOREIGN PATENT DOCUMENTS 647685  2/1985  Switzerland ............... 210/413

Primary Examiner—Robert A. Dawson
Assistant Examiner—Joseph Drodge
Attorney, Agent, or Firm—Longacre & White

[57] ABSTRACT

Apparatus for continuously removing from the mother liquor the crystals contained in a suspension of crystals in the mother liquor and for washing the crystals with a washing liquid, comprising a closed cylindrical chamber, feed devices for the suspension of crystals, discharge devices for removing the disintegrated crystal bed, feed devices for washing liquid, filter devices in the form of a flat ring for extracting mother liquor from the suspension supplied, while retaining crystals, transport devices in the form of rotating blades which are fitted in the cylindrical chamber above the filter devices and stator blades above the rotating blades being able to move backwards and forwards over a certain stroke in the axial direction between the filter devices and the stator blades fitted at a distance above the filter devices.

4 Claims, 2 Drawing Sheets

APPARATUS FOR CONTINUOUSLY REMOVING CRYSTALS FROM A MOTHER LIQUOR AND FOR WASHING THE CRYSTALS

The invention relates to an apparatus for continuously removing from the mother liquor the crystals contained in a suspension of crystals in a mother liquor and for washing the crystals with a washing liquid, comprising a closed cylindrical chamber having a feed side and a discharge side, feed devices for the suspension of crystals at the feed side, discharge devices for removing the disintegrated crystal bed from the discharge side, feed devices for washing liquid at the discharge side of the cylindrical chamber, filter devices in the form of a flat ring at the feed side for extracting mother liquor from the suspension supplied, while retaining crystals, to form a concentrated suspension, transport devices in the form of rotating blades which are fitted in the cylindrical chamber above the filter devices to cause the concentrated suspension to move forward continuously in the form of a compacted bed of crystals in the axial direction of the cylindrical chamber towards the discharge side thereof, and stator blades above the rotating blades.

An apparatus of this type is known from U.S. Pat. No. 4,475,355, in particular the embodiment specified in claim 8.

Said embodiment is also known in practice because the Applicant has constructed dozens of pieces thereof.

In this continuous washing column known in practice and briefly specified in claim 8 of the U.S. Pat. No. 4,475,355, the filter devices are fitted as a flat annular disc in the vicinity of the bottom end of the vertical cylindrical washing column, in particular in an annular chamber thereof. Fitted directly above this are the rotating blades, and directly above this again are stator blades in the annular chamber.

In addition to a continuously operating apparatus of this type, batchwise operating apparatuses are also known, so-called piston-type washing columns (see, for example, Dutch Patent Specifications 169,270 and 173,601).

The capacity of a washing column depends on the "quality" of the crystal suspension with which it is fed (crystal size, crystal size distribution, crystal shape, viscosity of the mother liquor and any solid parts contained therein).

The continuously operating washing column is, however, much more sensitive to the quality of the suspension than the piston-type washing column. Although a so-called countercurrent crystallizer can be used to make a suspension with which the continuous washing column functions ideally, the product to be processed, particularly in the foodstuff sector, is not always of identical quality (for example, is season-dependent) and "the" capacity (in kg of crystals per hour) is indirectly affected thereby.

The difference in the sensitivity to the quality of the suspension is explained as follows.

In the piston-type washing column, the suspension feed is open and the mother liquor discharge is closed during the filling stroke, and the suspension feed is closed and the mother liquor discharge is open during the compression stroke.

In the continuous washing column, there is a permanently open connection between the slurry feed and the mother liquor discharge. The force which has to has exerted on the bed is needed as forward pressure on the scraper, which is situated at the top of the cylindrical chamber, and as compensation for the washing pressure (counterpressure to maintain the washing front). The washing pressure is strongly dependent on the "quality" of the suspension.

In the plunger washing column, the feed of the suspension (filling stroke), the discharge of the mother liquor and the provision of said desired force on the bed take place consecutively.

In the continuous washing column this takes place simultaneously. Simultaneously exerting force and continuously maintaining feed and discharge are a limiting factor for the continuous washing column.

The object of the invention is to improve the known continuously operating washing column by combining the two washing columns in a certain sense.

This is achieved according to the invention in that the rotating blades are fitted so as to be able to move backwards and forwards over a certain stroke in the axial direction between the filter devices and the stator blades fitted at a distance above the filter devices.

The stator blades have thus been moved upwards and the stroke of the rotating blades is limited at the top by the stator blades and at the bottom by the filter disc.

The starting point is the situation in which the transporter formed by the rotating blades is as close as possible to the filter disc and clears the scraping edges of the filter disc. A limit switch energizes a hydraulic cylinder which forces the transporter away from the filter disc towards the stator blades, exerting the desired force in the process.

The chamber between the transporter and the filter disc is filled with crystals. If the transporter reaches its other end position, the pressure is released from the hydraulic cylinder. The transporter is then able to screw downwards while rotating through the filter cake. The forces on the bed are now supplied externally by the hydraulic cylinder and are no longer dependent on the flow conditions around the transporter.

The invention will be explained in more detail by reference to the drawing, in which.

Figure 1:
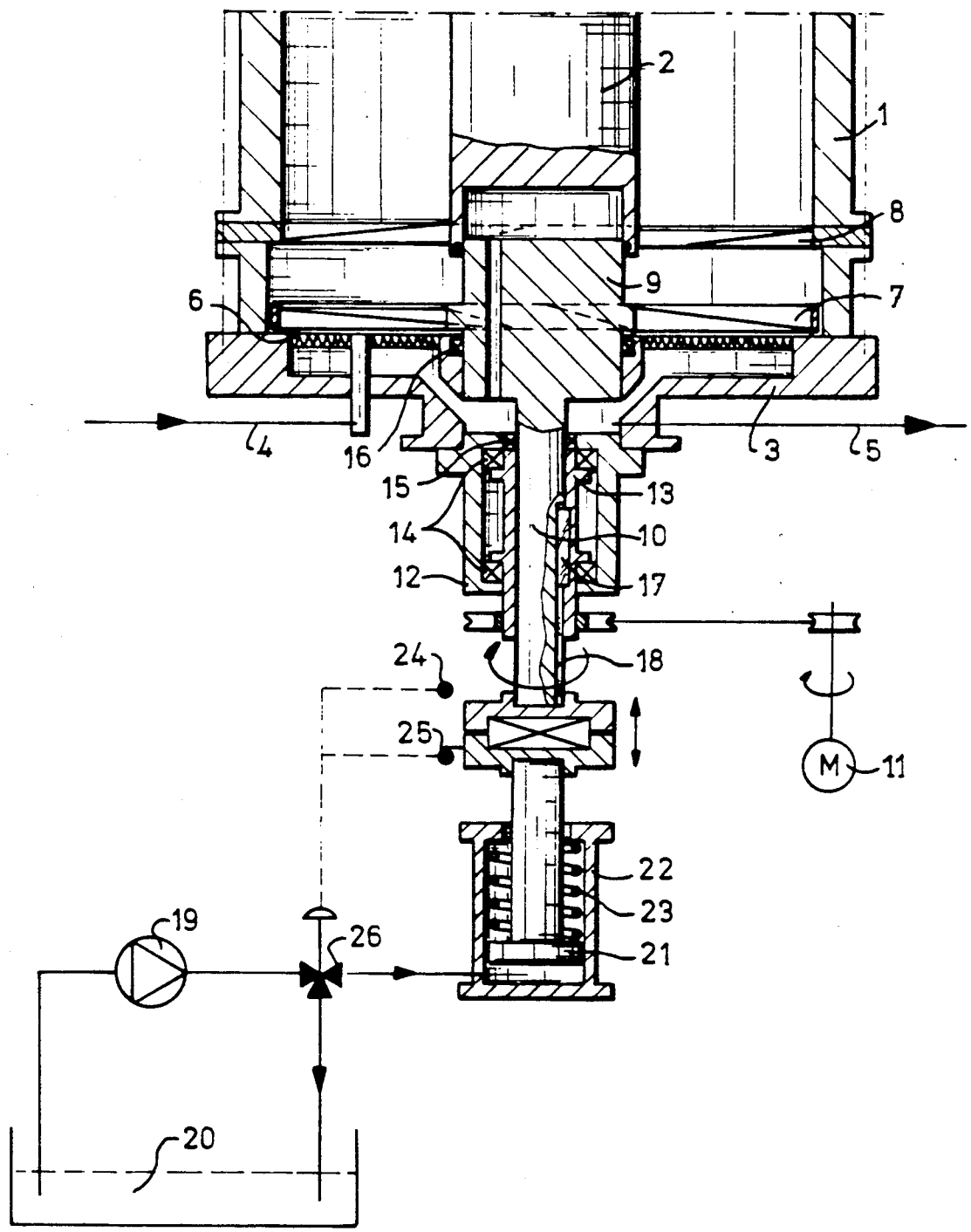
FIG. 1 is a diagrammatic longitudinal section through the bottom section of a washing column according to the invention whose upper section is conventional.

Reference is first made to FIG. 1.

The wall of the cylindrical chamber is indicated by 1. This contains a core 2 which is fitted in a fixed manner, as a result of which an annular chamber is formed.

The cylindrical chamber is terminated at the bottom by a transverse wall 3 through which the feed 4 for slurry and also the discharge 5 for mother liquor extend.

The flat annular filter disc is indicated by 6, the rotor by 7 and the stator by 8.

The rotor blades 7 are connected at the inside to a hub 9 which forms a single entity with the driving shaft 10 which can be driven in a rotary manner by a driving motor 11.

The driving shaft 10 is rotatably supported in a base 12 which is fitted in a fixed manner and which supports the entire washing column.

Up to this point, the apparatus is conventional, with this difference that the stator 8 is sited directly above the rotor 7 in the known apparatus.

According to the invention, the stator 8 has now been moved upwards and the rotor 7 is able not only to rotate but also to move up and down between the filter disc 6 and the stator 8.

For this purpose, the shaft 10 is provided with a concomitantly rotating bush 13 which is rotatably supported by means of bearings 14 in the base 12. 15 indicates a seal. A seal of this type, indicated by 16, is also situated between the hub 9 and the filter disc 6.

In the inside wall of the bush 13 there is a cutter 17 and in the outside wall of the shaft 10 a longer cutter track 18.

The rotation drive of the rotor 7 acts on the bush 13.

In addition, an axial movement can be produced by a hydraulic pump 19 which can feed oil under pressure from an oil reservoir 20 to the chamber beneath a piston 21 which is connected in a fixed manner to the shaft 10. Said piston 21 is able to move in a cylinder 22 and is loaded at the top by a compression spring 23.

Limit switches 24 and 25 are present.

When the uppermost limit position is reached, the switch 24 operates a shut-off valve 26, as a result of which the chamber under the piston 21 becomes pressureless and the piston 21 is forced downwards by the spring 23.

On reaching the lowermost limit position, the limit switch 25 ensures that this chamber is again put under pressure, with the result that the rotor 7 again moves upwards. Obviously, there has to be a chamber in the core 2 for receiving the upper section of the hub 9.

The direction of rotation of the rotor can remain unchanged because the rotor screws downwards through the filter cake during its downward stroke.

A beneficial stroke length is between 20 and 35% of the width of the annular chamber in the cylindrical wall 1.

The apparatus according to the invention also works completely continuously and combines the advantages of the continuous washing column with those of the piston-type washing column without acquiring the disadvantages of the two.

Figure 2:
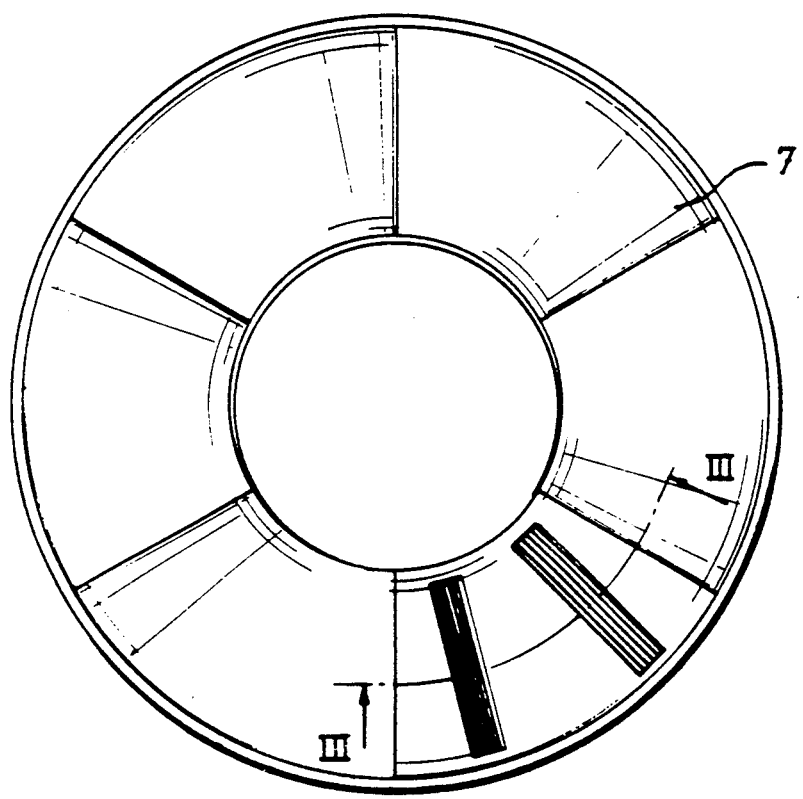
FIG. 2 is a top view of the rotor blades.
Figure 3:
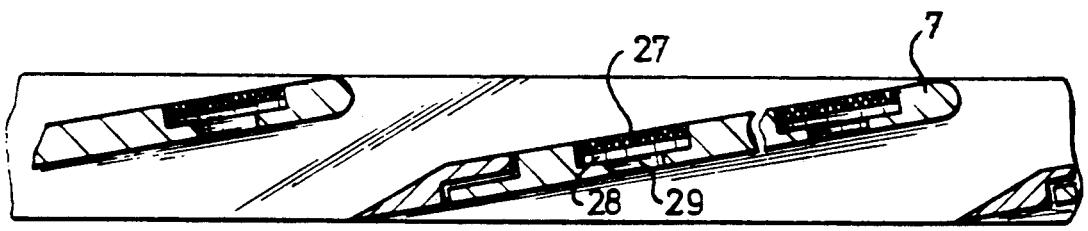
FIG. 3 is a section along the line III—III of FIG. 2.

FIG. 2 shows a plan view of the rotor 7 which consists of a number of inclined blades joined to one another in the manner of roofing shingles.

One or more filter strips 27 may be provided in each rotor blade 7 in chambers 28 with passages 29.

As a result of the presence of said filter strips 27, the mother liquor is able to pass through the blade 7 but the crystals are not.

I claim:

1. Apparatus for continuously removing crystals from a suspension of the crystals in a mother liquor and for washing the crystals with a washing liquid, the apparatus comprising:
    a closed cylindrical chamber having an axis defining an axial direction and having a feed side and a discharge side;
    a crystal suspension feed device for supplying the suspension of crystals at the feed side;
    a discharge device for removing the crystals from the discharge side;
    a washing liquid feed device for providing the washing liquid to the cylindrical chamber;
    a filter device in the form of a flat ring at the feed side for extracting the mother liquor from the suspension supplied, while retaining the crystals, to form a concentrated suspension;
    a transport device comprised of rotating blades which are fitted in the cylindrical chamber downstream of the filter device, said rotating blades causing the crystal suspension to move continuously in the axial direction of the cylindrical chamber towards the discharge side thereof, said concentrated suspension comprising a compacted bed of crystals;
    stator blades fitted directly downstream of the rotating blades said rotating blades positioned in a space axially defined between the filter device and the stator blades; and
    a reciprocable drive,
    wherein the rotating blades are fitted so as to be movable reciprocally by said reciprocable drive in the axial direction of the cylindrical chamber in said space created between the filter device and the stator blades by the stator blades being fitted so as to spaced axially apart from the filter device.

2. Apparatus according to claim 1, wherein the rotating blades are provided with scraping edges.

3. Apparatus according to claim 1, wherein:
    said reciprocable drive comprises a piston and cylinder assembly actuable between travel limiting switches.

4. Apparatus according to claims 1 or 2, wherein the rotating blades are constructed over parts of their surfaces as a filter, the mother liquor being allowed therethrough, but not the crystals.

* * * * *